US008981585B2

(12) United States Patent
Soong

(10) Patent No.: US 8,981,585 B2
(45) Date of Patent: Mar. 17, 2015

(54) SUBSURFACE INTELLIGENT CLUSTER OF CURRENT ENERGY CONVERTERS

(71) Applicant: Yin Shang Soong, Lancaster, PA (US)

(72) Inventor: Yin Shang Soong, Lancaster, PA (US)

(*) Notice: Subject to any disclaimer, the term of this patent is extended or adjusted under 35 U.S.C. 154(b) by 21 days.

(21) Appl. No.: 13/856,619

(22) Filed: Apr. 4, 2013

(65) Prior Publication Data

US 2014/0062091 A1 Mar. 6, 2014

Related U.S. Application Data

(60) Provisional application No. 61/696,165, filed on Sep. 1, 2012.

(51) Int. Cl.
F03B 13/00 (2006.01)
H02P 9/04 (2006.01)
F03B 13/10 (2006.01)
F03B 17/06 (2006.01)

(52) U.S. Cl.
CPC .............. *F03B 13/10* (2013.01); *F03B 17/063* (2013.01); *F05B 2240/95* (2013.01); *Y02E 10/28* (2013.01); *Y02E 10/22* (2013.01)
USPC .......................................................... 290/54

(58) Field of Classification Search
CPC . Y02E 10/28; Y02E 10/223; F05B 2240/213; F05B 2250/25; F05B 2210/16; F05B 2220/706; F05B 2240/97; Y02T 10/7083
USPC .......................................................... 290/54
See application file for complete search history.

(56) References Cited

U.S. PATENT DOCUMENTS

| | | | | |
|---|---|---|---|---|
| 3,697,765 A * | 10/1972 | Carini | ............................. | 290/54 |
| 4,151,424 A * | 4/1979 | Bailey | ............................. | 290/54 |
| 4,219,303 A | 8/1980 | Mouton, Jr. | ....................... | 415/7 |
| 4,748,808 A * | 6/1988 | Hill | ............................. | 60/398 |
| 5,440,176 A | 8/1995 | Haining | ......................... | 290/54 |
| 5,642,984 A * | 7/1997 | Gorlov | ............................ | 416/176 |
| 6,006,518 A | 12/1999 | Geary | ............................ | 60/398 |
| 6,036,443 A * | 3/2000 | Gorlov | ............................ | 416/176 |
| 6,097,104 A * | 8/2000 | Russell | ............................ | 290/54 |
| 6,109,863 A * | 8/2000 | Milliken | ........................ | 415/1 |
| 6,172,429 B1 * | 1/2001 | Russell | ............................ | 290/54 |
| 6,518,680 B2 * | 2/2003 | McDavid, Jr. | ................... | 290/54 |
| 6,710,469 B2 * | 3/2004 | McDavid, Jr. | ................... | 290/55 |
| 6,800,955 B2 * | 10/2004 | McDavid, Jr. | ................... | 290/54 |

(Continued)

OTHER PUBLICATIONS

Batchelor, G.K., "Introduction to Fluid Dynamics" Section 3.5 ; p. 162, Special forms of *Bernoulli's theorem*, Cambridge University Press, 2000.

*Primary Examiner* — Pedro J Cuevas

(57) ABSTRACT

A subsurface floating cluster of current energy converters is disclosed. A cluster consists of many nodes on a single mooring cable. Two converters, rotating in opposite direction, are connected as a pair. At least two pairs, four converters, are connected to each node. Each converter consists of a rotor with curved blades, a transmission, and an electrical generator. A computer on the mother ship, that tows the cluster, controls the rotating rate of every rotor in the cluster. Each node moves vertically or horizontally according to the rotation-rate-differential in each pair of rotors. Each node seeks and remains in peak velocity region, or at a predetermined water depth, to convert kinetic energy to electricity with an optimal efficiency. This invention has characteristics of simplicity in design, using artificial intelligence to achieve high efficiency in peak speed region of an ocean current, incremental capacity, and mobility.

7 Claims, 9 Drawing Sheets

(56) References Cited

U.S. PATENT DOCUMENTS

| | | | |
|---|---|---|---|
| 6,948,905 B2* | 9/2005 | Horjus | 415/4.2 |
| 7,008,171 B1* | 3/2006 | Whitworth | 415/4.2 |
| 7,056,082 B1* | 6/2006 | Taylor | 415/4.2 |
| 7,132,760 B2* | 11/2006 | Becker | 290/54 |
| 7,215,037 B2* | 5/2007 | Scalzi | 290/55 |
| 7,362,004 B2* | 4/2008 | Becker | 290/55 |
| 7,470,086 B2 | 12/2008 | Jennings | 405/76 |
| 7,652,388 B2* | 1/2010 | Lyatkher | 290/53 |
| 8,039,978 B2* | 10/2011 | Gillett | 290/44 |
| 8,057,174 B2* | 11/2011 | Scholte-Wassink | 416/35 |
| 8,358,030 B2* | 1/2013 | Plaskove et al. | 290/55 |
| 8,419,346 B2* | 4/2013 | Attey | 415/4.2 |
| 8,497,594 B2* | 7/2013 | Rajadhyaksha et al. | 290/53 |
| 8,525,363 B2* | 9/2013 | Rajadhyaksha et al. | 290/53 |
| 8,610,304 B2* | 12/2013 | Filardo | 290/54 |
| 8,786,122 B2* | 7/2014 | Rajadhyaksha et al. | 290/53 |
| 8,870,540 B2* | 10/2014 | Houlsby et al. | 416/187 |
| 2001/0001299 A1* | 5/2001 | Gorlov | 440/8 |
| 2002/0180216 A1* | 12/2002 | McDavid, Jr. | 290/54 |
| 2003/0025334 A1* | 2/2003 | McDavid, Jr. | 290/54 |
| 2004/0096327 A1* | 5/2004 | Appa et al. | 416/1 |
| 2007/0108768 A1* | 5/2007 | Dempster | 290/42 |
| 2009/0091134 A1* | 4/2009 | Lyatkher | 290/54 |
| 2009/0196763 A1* | 8/2009 | Jones et al. | 416/90 R |
| 2010/0092291 A1* | 4/2010 | Scholte-Wassink | 416/37 |
| 2010/0140947 A1* | 6/2010 | McEntee et al. | 290/54 |
| 2010/0181780 A1* | 7/2010 | Gillett | 290/1 R |
| 2010/0284809 A1* | 11/2010 | Houlsby et al. | 416/178 |
| 2012/0235418 A1* | 9/2012 | Plaskove et al. | 290/55 |
| 2013/0026761 A1* | 1/2013 | Rajadhyaksha et al. | 290/54 |
| 2013/0026762 A1* | 1/2013 | Rajadhyaksha et al. | 290/54 |
| 2013/0147199 A1* | 6/2013 | Zambrano et al. | 290/54 |
| 2014/0105752 A1* | 4/2014 | Andrews | 416/241 R |
| 2014/0161642 A1* | 6/2014 | Rajadhyaksha et al. | 417/334 |

* cited by examiner

SUBSURFACE INTELLIGENT CLUSTER OF CURRENT ENERGY CONVERTERS

BACKGROUND OF THE INVENTION

1. Field of the Invention

The present invention relates generally to a mooring system and supporting devices to convert ocean current energy to electricity.

2. Description of Related Art

The use of kinetic energy in water flow has been known for many years in human history. The physical principle is simple and it is easy to construct a machine to tap the river flow energy. Ancient people used flow in river to do work for them with a water wheel. There has been, however, little advance in using ocean current energy although various ideas were known since the discovery of strong current such as the Gulf Stream. One critical difficulty is the fact that ocean currents change with time in location, depth and speed. Many patented designs, such as in Haining (U.S. Pat. No. 5,440,176) and Geary, (U.S. Pat. No. 6,006,518) are anchored devices on the seafloor at a fixed location. Mouton (U.S. Pat. No. 4,219,303) and Jennings and Martin (U.S. Pat. No. 7,470,086) patented floating submarine turbines that are also anchored on the ocean floor by cables. None of the patented inventions can intelligently seek and remain in the peak velocity region of ocean currents. The present invention has a built-in intelligence to overcome the critical difficulty to achieve an optimal efficiency to convert current energy to electricity.

BRIEF SUMMARY OF THE INVENTION

The invention relates to a configuration of a cluster of current energy converters. The cluster is towed by a cable behind a mother ship 1 which is anchored in a current 2 in FIG. 1. The cluster consists a serial or nodes 3 connected by a single cable 4 that serves both for electric power and signal transmissions. The current energy converters, equipped with rotors 5, 6 and connecting generators 7, 8 attached to each node 3 like wings to an airplane body FIG. 2. Each rotor looks like a so-called Savonius wind turbine (only two blades shown for illustration). As each rotor rotates in current, the connecting generator converts kinetic energy to electricity. The two rotors in each pair FIG. 3 always rotate in opposite direction, one 5 in clockwise direction but the other 6 in counter-clockwise direction. The opposite rotation is due to the drag force difference on the two rotors' blades. There is no net torque on the node from the two opposing rotations if they rotate at the same rate. There are at least two pairs, four converters, one pair on each side, for a working node FIG. 2. There could be more than two pairs on each node to increase the capacity of power generation. But there must be equal number of pairs on both side of a node for symmetry. There could be many nodes in the cluster to further increase the total power generation. Each node and each converter are designed to be near average water density and therefore neutrally buoyant. A node, with the same number of pairs of converters on both sides of the node, behaves like an 'airplane flying' in water.

In each pair, the two rotors will rotate independently. If both rotors in the pair rotate at the same rate, this pair will remain at the same depth in a current. However, if one rotor rotates faster than the other one in the pair, this pair will either ascend or descent, according to Bernoulli principle (Batchelor, 2000) that says pressure is higher for slower flow, and vice versa, around an immersed body in fluid. When the average flow speed above the pair is higher than that below the pair, this 'wing' will ascend because the pressure is higher below the 'wing'. This is the same principle for an airplane to fly in air due to an asymmetrical profile of the aerofoil. The rotating rate of a rotor is determined by the resistance of the attached generator through a transmission in a given current. When the resistance from the generator increases, the rotor rotates slower for the same water flow speed. The rotation can also be slowed down by an auxiliary brake. The other 'wing', the pair of converters on the other side of the node, also ascends or descends depending on the relative rotating rate of the two rotors in that pair. If both 'wings' descend, this node dives to a deeper water, and the node ascends toward surface if both 'wings' ascend. If one 'wing' ascends but the other wing descends, the two pairs rotate to an angle relative to the horizon, and consequently move horizontally. Each rotor is equipped with a pressure sensor and a rotation speedometer. Each node is equipped with a pressure sensor and a flow meter. There is an electric water pump in the node with two nozzles, one pointing downward 12 and one pointing upward 13. The nozzles are used for minute adjustment of the node depth. The towing cable 4 is retracted and released for retrieval and deployment, respectively, from a spool in the node 3 compartment. Whenever the ocean current changes its speed, the flow meter on the node sends the new data to the mother ship computer. The computer controls each node to move vertically or horizontally for the current energy converters to remain in the peak velocity region. An optimal efficiency for the current energy generation is achieved by this intelligent mooring cluster. The cluster is kept at a subsurface water depth to avoid any vessels or fishing operations at ocean surface.

DETAILED DESCRIPTION OF THE PREFERRED EMBODIMENT

Figure 1:
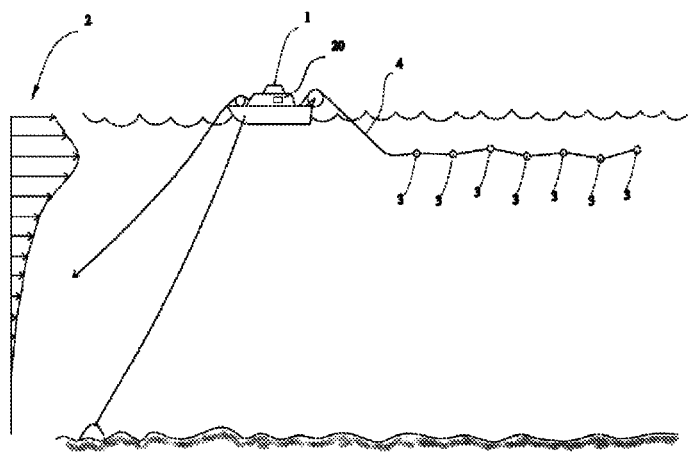
FIG. 1 shows an anchored mother ship 1 with a cluster of current energy converters. A typical speed profile in a strong ocean current 2 is shown on the left side of the figure. Notice the peak speed may not be at the sea surface but below the surface.
Figure 2:
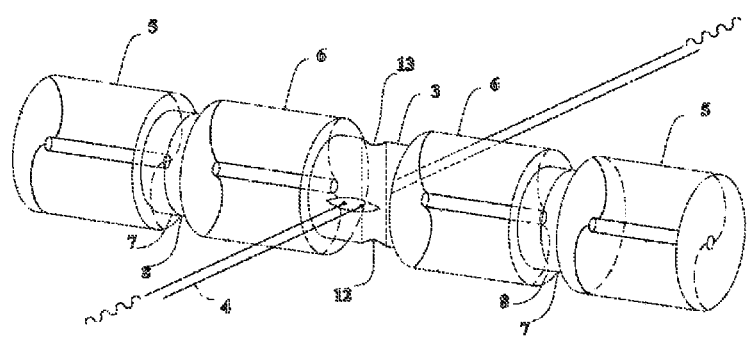
FIG. 2 shows a node 3 with four current energy converters 5,6. Two converters attach on each side of the node 3 as a pair. Each converter has a rotor and a chamber for an electrical generator, transmission gears and sensors. The two rotors always rotate independently in opposite direction in the pair. The node is equipped with an electric water pump and two nozzles, one 13 upward and one 12 downward, for minute adjustments of the node in water depth. The towing cable 4 transmits both electrical power and digital signal between each node and the mother ship. The cable 4 is retractable on a spool (not shown) in the node compartment.
Figure 3:
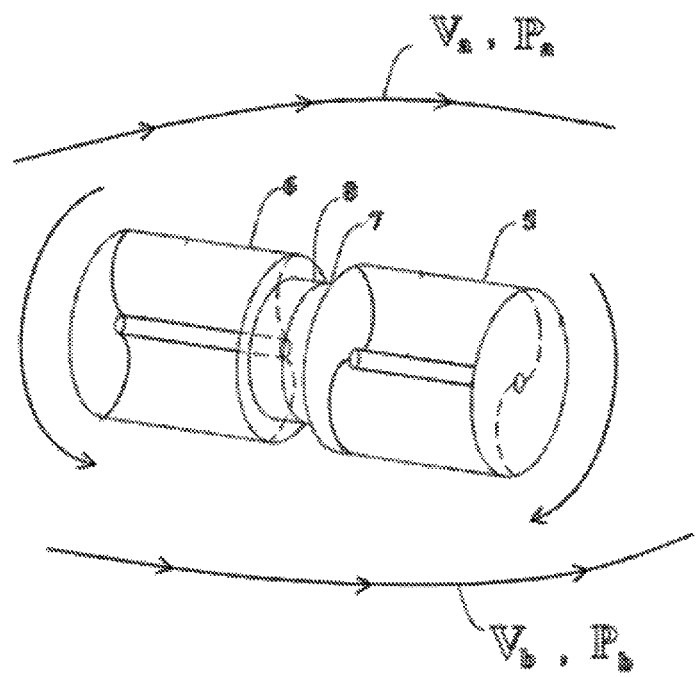
FIG. 3 shows a pair of two converters with spinning rotors 5,6. The average flow speed above the pair is labeled $V_a$ and the average flow speed below the pair is labeled $V_b$. The average water pressure above the pair is labeled $P_a$ and the average water pressure below the pair is labeled $P_b$.

The invention relates to an application of Bernoulli principle on each pair of rotors that rotate in opposite direction independently. FIG. 3 is used to illustrate this principle in details. When current flow pushes both rotors into rotation in opposite directions because of the drag force is larger on the top blade than that on the bottom blade in rotor 5 but it is exactly the opposite in rotor 6. The two rotors are rotating with the same rate when the resistances due to respective electrical generators 7, 8 are the same. The average flow speeds above and below the two rotors are the same because the two rotors rotate in opposite directions at the same rate. Therefore, $V_a$ equals $V_b$, that leads to $P_a$ equals $P_b$ according to Bernoulli equation, Eq. 1.

$$0.5(V_a)^2 + P_a/\rho = 0.5(V_b)^2 + P_b/\rho \qquad \text{Eq. 1}$$

where $V_a$ and $V_b$ are speed, $P_a$ and $P_b$ are pressure, and $\rho$ is water density.

However, rotor 5 rotates slower when the resistance increases in the connecting generator 7. This is accomplished by the mother ship computer that sends a command to change the gear ratio in the transmission (not shown) between rotor 5 and its electrical generator 7. But the resistance in generator 8 for rotor 6 is not changed, the rotor 6 does not change its rotating rate. As a result, the average flow speed, $V_a$, slows down above the pair. The average flow speed, $V_b$, also slows down, but not as much as $V_a$ because the curved blades always cause a larger drag force when they rotate to be above the rotating axial in rotor. The Bernoulli equation Eq. 1 dictates that $P_a$ larger than $P_b$ when $V_a$ is smaller than $V_b$. The larger average pressure, $P_a$, consequently, pushes the pair downward into deeper water. Based on the same principle, if the rotor 6, rotating counter-clockwise, has a slower rate than that of rotor 5, $V_b$ is smaller than $V_a$ for a constant water density. Consequently, $P_b$ is larger than $P_a$, this pair moves upward into shallower water. The mother ship computer makes adjustment on the gear ratio in transmission at each converter to change its rotation rate, and therefore controlling the depth of the pair. The computer also controls the other 'wing' such that the node can be commanded to move up or down, vertically. The node moves horizontally by tilting the 'wings' just like an airplane when one pair moves upward but the other pair moves downward. The computer actively directs each node to stay in the peak velocity region based on the data from flow meter on the node. For each particular ocean current with its specific characteristics, a computer algorithm is prepared to achieve an optimal efficiency of ocean current energy conversion.

Figure 4:
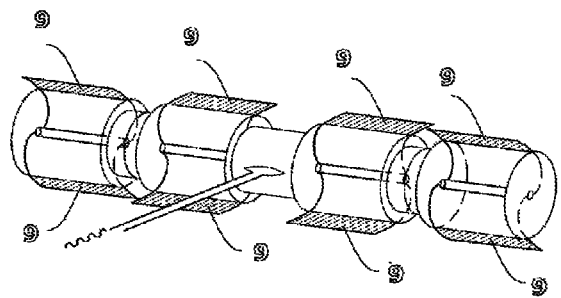
FIG. 4 shows four portable converters and a small size node 10 that can be carried in a suitcase 11. There are extendable blades 9 on the portable rotors to increase power generation capacity.
Figure 4:
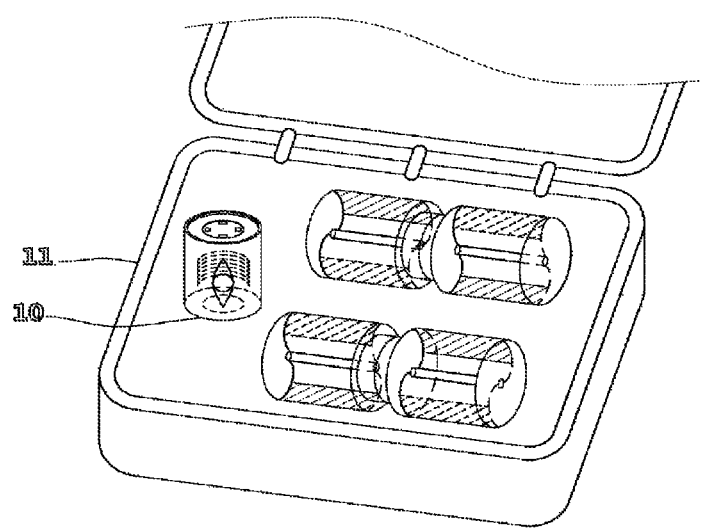
Figure 5:
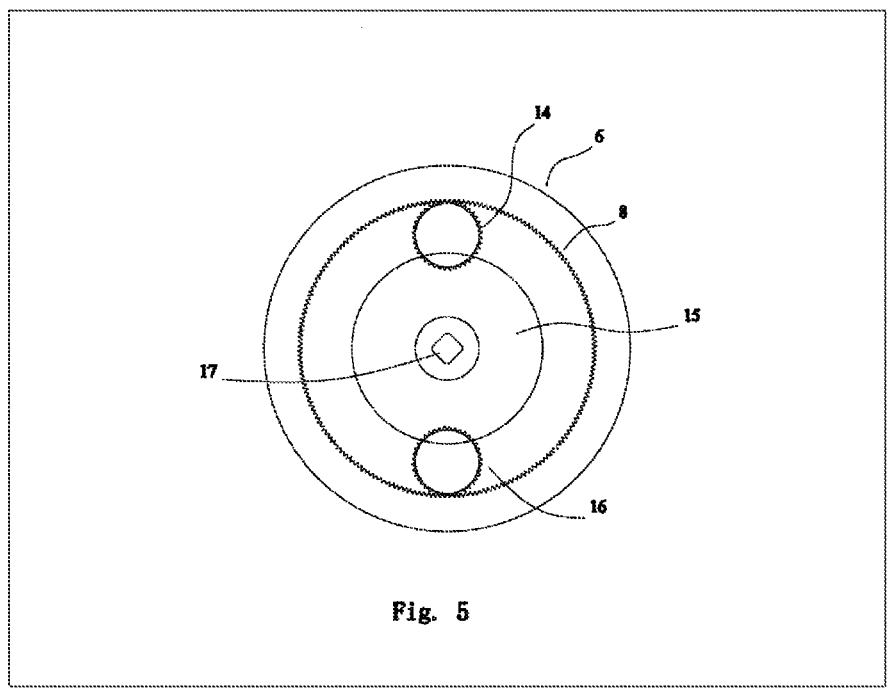
FIG. 5 shows the generator chamber at one end of each rotor. The generator 15 is mounted on the axial. One side of the generator is a transmission gear box 14 and the other side is an auxiliary braking mechanism 16. A pressure sensor 17 and rotation rate sensor 24 are mounted on the other end of the rotor axial.
Figure 6:
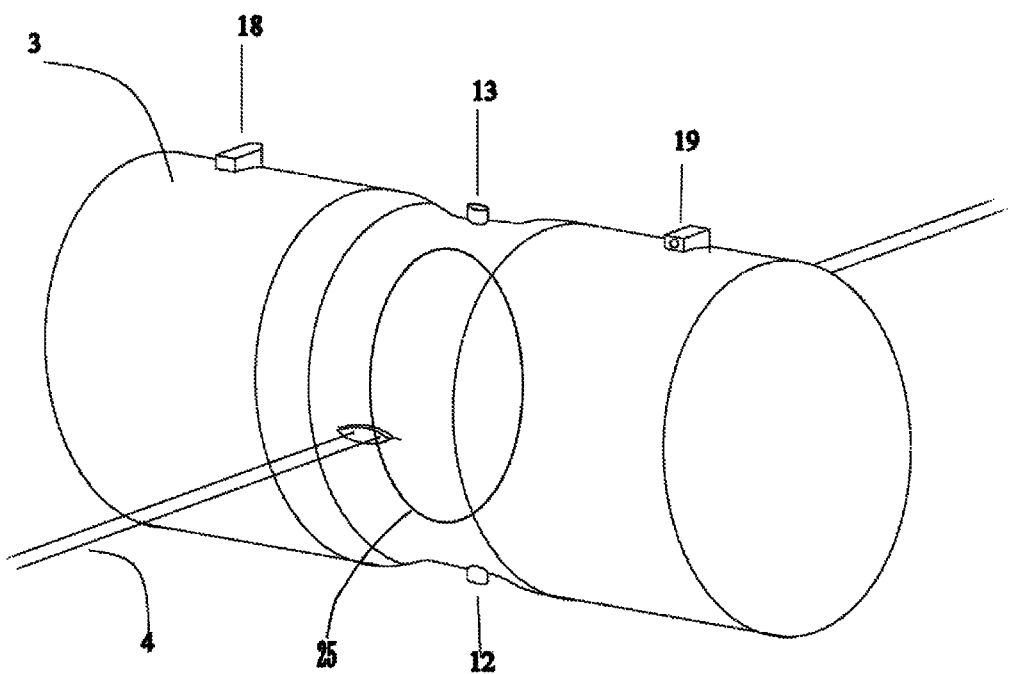
FIG. 6 shows a node 3. A pressure sensor 18 and a flow meter 19 are mounted on the top of the node. A spool 25 that retracts or releases the towing cable is mounted in the node.
Figure 7:
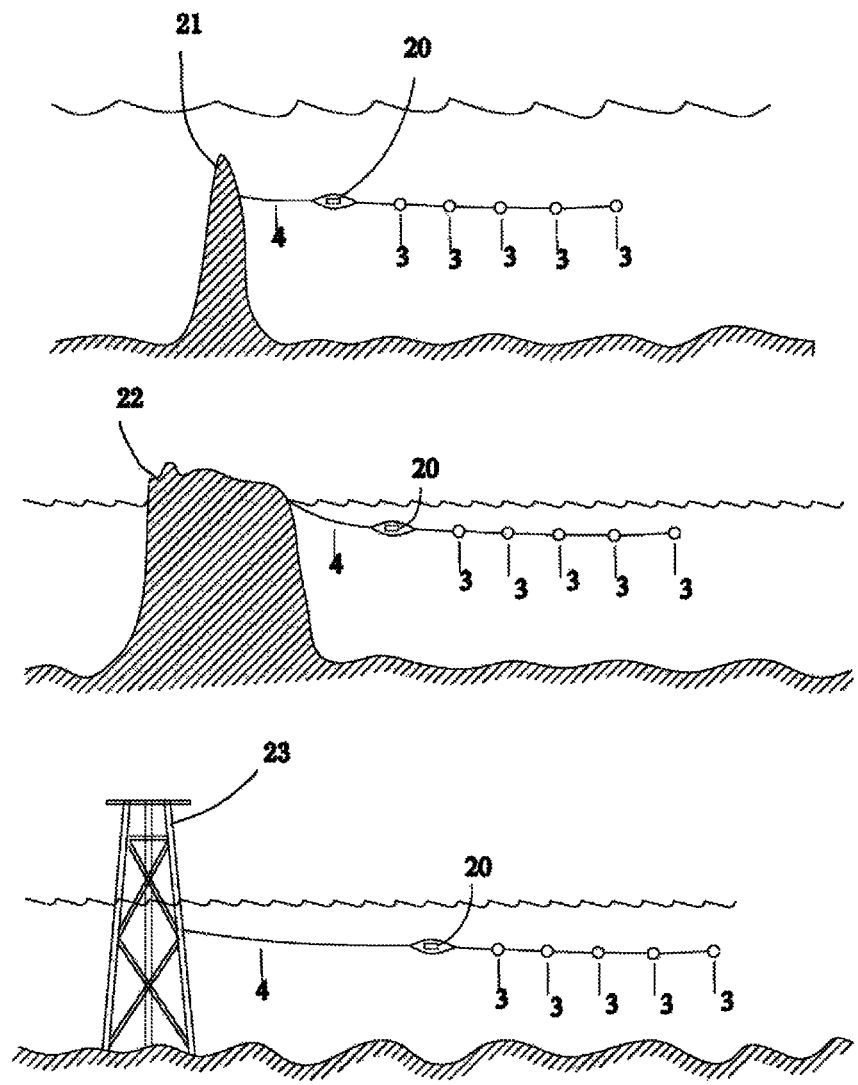
FIG. 7 shows additional mooring configurations: a seamount 21; an island 22; and an oil-drilling rig 23.
Figure 8:
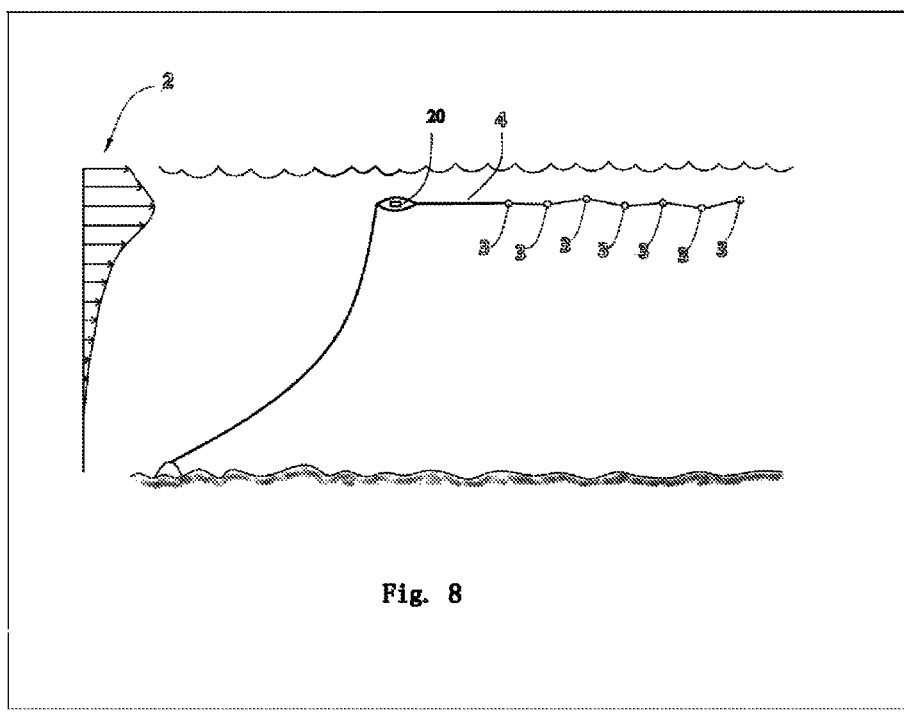
FIG. 8 shows a submersible mother ship, the computer 20 inside the mother ship with a cluster of current energy converters.
Figure 9:
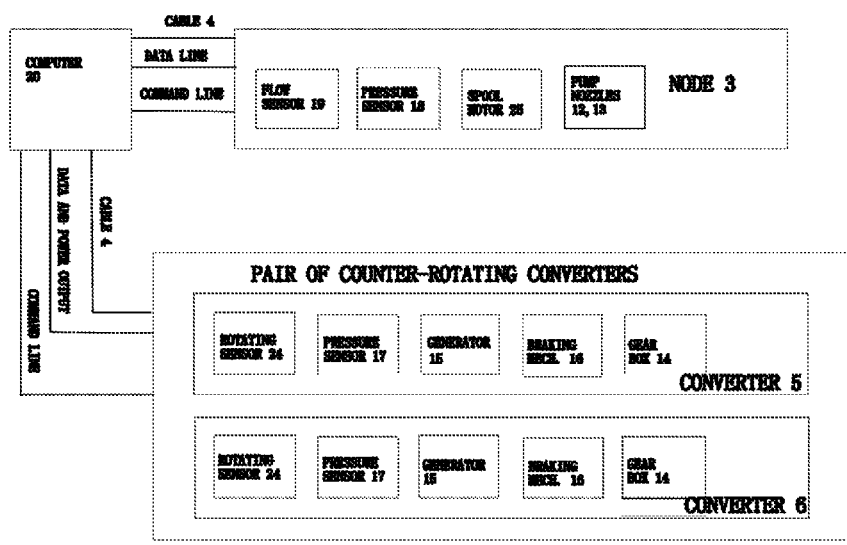
FIG. 9 shows the essential structural connections of elements. The mother ship computer 20 is connected to a node 3. A pair of two converters 5,6 is connected to the node.

There are many practical advantages in the modular design of this invention. The initial investment to begin a working node requires only four converters. The capacity of power generation from each converter specifies the actual size and desired efficiency in a particular ocean current. For example, each converter would generate one thousand Watts of electric power for rotor blades of two meters by two meters in size, rotating at a rate of ten revolutions per minute, in an ocean current with one meter per second speed. For this size system, there are four thousands Watts from four converters on one node. Because the power generation is proportional, at least, no the square of current speed, each node has sixteen thousands Watts of power generation in a current of two meters per second speed that is the typical peak speed in the Gulf Stream off the east coast of the state of Florida. When the blades are reduced to be five cm by 10 cm in size but with extension 9 in FIG. 4, each node has at least a hundred Watts power generation. The two pairs of converters and a small node compartment 10 fit in a suitcase 11 for portability. Such portable cluster is very useful on small vessels in river or coastal sea for emergency power supply.

The simple mechanical design of a rotor and generator with a companion transmission does not require any new technology. The design of retractable towing cable in nodes enables easy deployment and retrieval. The mother ship moves easily to a different location at any time in case of severe weather or concerns of security and/or environmental issues. The subsurface depth of the converters does not interfere with commercial fishing activities at ocean surface. This invention has characteristics of simplicity in design, using artificial intelligence to achieve high efficiency in peak speed region of an ocean current, incremental capacity, and mobility.

TABLE OF DRAWING ELEMENTS

1. Mother ship
2. Current profile
3. Node
4. Cable
5. Energy converter
6. Energy converter
7. Converter chamber for generator
8. Converter chamber for generator
9. Extendable blade for small converter
10. Small size node
11. Suitcase for portable system
12. Downward nozzle
13. Upward nozzle
14. Transmission gear box
15. Generator
16. Braking mechanism
17. Converter pressure sensor
18. Node pressure sensor
19. Node flow meter
20. Computer
21. Seamount
22. Island
23. Oil platform
24. Rotation rate sensor
25. Spool

What is claimed is:

1. A system for generating electricity from the flow of seawater through two ocean current energy converters interconnected as a pair, two of said pairs defining a first node, each said converter comprising:
   a rotor defined by blades extending from a rotatable shaft and
   a chamber that houses an electrical generator and transmission, said shaft connected to said electrical generator through said transmission;

at least one pressure sensor and sensors for measuring said rotor's rotation rate, said sensors contained within said chamber;

a flow meter for sensing the seawater flowrate, said flow meter attached to said node;

a braking mechanism to add braking force to one said shaft responsive to said pressure sensor;

said two converters being mated so that said rotors only rotate in opposite directions, wherein one said rotor rotates clockwise the other said rotor always rotates counter-clockwise; and wherein said node and each said converter are designed to be equal to average water density and therefore neutrally buoyant in water.

2. The system of claim 1, wherein said connection cable extends between said node and a computer that is mounted on a platform, said cable comprising:

data and power transmission between said node and said computer, said data including data generated by said sensors;

said computer configured to send commands to each said transmission in each said converter to change said rotor's rotation rate;

said computer being configured to send commands a said converter to apply said braking mechanism to change said rotors rotation rate;

said computer further configured to send said commands in order to keep each said node to remain in peak speed region of ocean current to achieve an optimal efficiency of energy conversion and to keep said node at a predetermined water depth; and wherein said node sends current speed data and water depth data to said computer through said connection cable;

and each said converter sends water depth data and rotation rate data to said computer.

3. The system of claim 2, wherein said platform comprises a movable platform selected from a group including an anchored surface ship and an anchored submersible vessel.

4. The system of claim 2, wherein said platform comprises a platform selected from a group including an oil-drilling rig, an island, and a seamount.

5. The system of claim 1, wherein said pair of ocean energy converters comprises two identical modules with one said electrical generator and one said gear-transmission in each said module.

6. The system of claim 1, wherein said pair of ocean energy converters comprises two converters sharing one said electrical generator and with two separate said transmissions.

7. The system of claim 1, wherein said pair of ocean energy converters are sized to be carried in a suitcase; the said portable converters are further designed with extendable blades to increase power outputs in river flow and coastal current.

* * * * *